United States Patent
Hassan et al.

(10) Patent No.: US 10,368,225 B2
(45) Date of Patent: Jul. 30, 2019

(54) LOCATION DETERMINATION FOR A SERVICE REQUEST

(71) Applicant: Microsoft Technology Licensing, LLC, Redmond, WA (US)

(72) Inventors: Amer Aref Hassan, Kirkland, WA (US); Russell Andrew Penar, Highlands Ranch, CO (US); David Michael Halley, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/639,413

(22) Filed: Jun. 30, 2017

(65) Prior Publication Data
US 2019/0007807 A1 Jan. 3, 2019

(51) Int. Cl.
*H04W 4/02* (2018.01)
*H04W 4/90* (2018.01)
*G06F 17/30* (2006.01)

(52) U.S. Cl.
CPC ............ *H04W 4/90* (2018.02); *H04W 4/02* (2013.01); *G06F 17/30241* (2013.01)

(58) Field of Classification Search
CPC ..... H04W 76/007; H04W 4/22; H04W 4/028; H04W 4/02; H04M 3/42348; H04M 3/42357; H04L 65/1016
USPC ...................... 455/456.1, 404.1, 403; 379/37
See application file for complete search history.

(56) References Cited

U.S. PATENT DOCUMENTS

| | | | |
|---|---|---|---|
| 3,985,972 | A | 10/1976 | Rolin et al. |
| 4,661,974 | A | 4/1987 | Bales et al. |
| 5,552,795 | A | 9/1996 | Tayloe et al. |
| 5,839,063 | A | 11/1998 | Lee |
| 7,194,273 | B2 | 3/2007 | Vaudreuil |
| 7,444,148 | B1 | 10/2008 | Cook |

(Continued)

FOREIGN PATENT DOCUMENTS

| | | |
|---|---|---|
| EP | 0799555 A1 | 10/1997 |
| EP | 1435749 | 7/2004 |

(Continued)

OTHER PUBLICATIONS

"Assessment of VoIP location capabilities to support emergency services", https://www.ofcom.org.uk/_data/assets/pdf_file/0018/49302/emergency-voip-location.pdf, Published on Jun. 28, 2011, 59 pages.

(Continued)

*Primary Examiner* — Phuoc H Doan
(74) *Attorney, Agent, or Firm* — Schwegman Lundberg & Woessner, P.A.

(57) ABSTRACT

Techniques for location determination for a service request are described. A service request, for instance, represents a request for emergency services. In one or more implementations, data corresponding to service request is received over a network from a communication client implemented at a client device. A registered location of the communication client and an updated location of the client device is obtained, and the updated location of the client device is compared to the registered location of the communication client. If the updated location is different than the registered location, the data of the service request is routed along with the updated location to an answering point.

20 Claims, 8 Drawing Sheets

(56) References Cited

U.S. PATENT DOCUMENTS

| | | |
|---|---|---|
| 7,899,167 B1 | 3/2011 | Rae |
| 8,036,160 B1 | 10/2011 | Oakes |
| 8,249,055 B2 | 8/2012 | Beinroth et al. |
| 8,315,635 B2 | 11/2012 | Nicholson et al. |
| 8,358,645 B2 | 1/2013 | Xu |
| 8,406,813 B2 | 3/2013 | Kirbas et al. |
| 8,437,790 B1 | 5/2013 | Hassan et al. |
| 8,478,277 B2 | 7/2013 | Jiang |
| 8,498,222 B2 | 7/2013 | Brooks et al. |
| 8,554,168 B1 | 10/2013 | Bonner et al. |
| 8,594,298 B2 | 11/2013 | Klein et al. |
| 8,600,391 B2 | 12/2013 | Vendrow et al. |
| 8,849,267 B2 | 9/2014 | Garg |
| 9,060,075 B2 | 6/2015 | Goodman et al. |
| 9,185,526 B2 | 11/2015 | Guba et al. |
| 9,311,496 B1 | 4/2016 | Dutch et al. |
| 9,319,519 B2 | 4/2016 | Lee et al. |
| 9,426,302 B2 | 8/2016 | Layman et al. |
| 9,443,010 B1 | 9/2016 | Glooip et al. |
| 9,706,351 B1 | 7/2017 | Brewer |
| 10,165,495 B1 | 12/2018 | Hassan et al. |
| 2004/0229620 A1 | 11/2004 | Zhao et al. |
| 2005/0020263 A1 | 1/2005 | Sherman et al. |
| 2005/0101327 A1 | 5/2005 | Nam et al. |
| 2005/0215243 A1 | 9/2005 | Black et al. |
| 2005/0259802 A1 | 11/2005 | Gray et al. |
| 2006/0020459 A1 | 1/2006 | Carter et al. |
| 2006/0039539 A1 | 2/2006 | Goldman et al. |
| 2006/0089140 A1 | 4/2006 | Zhang |
| 2006/0205404 A1 | 9/2006 | Gonen et al. |
| 2007/0060097 A1 | 3/2007 | Edge |
| 2008/0101552 A1 | 5/2008 | Khan et al. |
| 2008/0125077 A1 | 5/2008 | Velazquez et al. |
| 2008/0304487 A1 | 12/2008 | Kotecha |
| 2009/0003314 A1 | 1/2009 | Hubner |
| 2009/0011759 A1 | 1/2009 | Alperovich et al. |
| 2009/0196284 A1 | 8/2009 | Beinroth |
| 2009/0279534 A1 | 11/2009 | Reiher |
| 2010/0056100 A1 | 3/2010 | Elman et al. |
| 2010/0080216 A1 | 4/2010 | Croy |
| 2010/0153733 A1 | 6/2010 | Heffez |
| 2012/0282924 A1 | 11/2012 | Tagg et al. |
| 2013/0121214 A1 | 5/2013 | Ma et al. |
| 2013/0203408 A1 | 8/2013 | Dowds et al. |
| 2013/0294443 A1 | 11/2013 | Kahn |
| 2013/0331096 A1 | 12/2013 | Rogan |
| 2014/0036658 A1 | 2/2014 | Bonner et al. |
| 2014/0074596 A1 | 3/2014 | Kolluri et al. |
| 2014/0273982 A1 | 9/2014 | Faliero et al. |
| 2014/0337094 A1 | 11/2014 | Jain |
| 2014/0376414 A1 | 12/2014 | Edge et al. |
| 2015/0080016 A1* | 3/2015 | Smith ................ H04L 65/1006 455/456.1 |
| 2015/0201086 A1 | 7/2015 | Abi et al. |
| 2015/0237469 A1 | 8/2015 | Stephens et al. |
| 2015/0271855 A1 | 9/2015 | Livingood |
| 2016/0007159 A1 | 1/2016 | Dupray et al. |
| 2016/0094725 A1 | 3/2016 | Dabbiere |
| 2016/0112466 A1 | 4/2016 | Gunnalan |
| 2016/0241719 A1 | 8/2016 | Kahn |
| 2016/0337513 A1 | 11/2016 | Seward et al. |
| 2017/0034357 A1 | 2/2017 | Salomon et al. |
| 2017/0188395 A1 | 6/2017 | Kim et al. |
| 2018/0124561 A1 | 5/2018 | Hassan et al. |
| 2018/0376279 A1 | 12/2018 | Hassan et al. |
| 2019/0028865 A1 | 1/2019 | Raleigh et al. |

FOREIGN PATENT DOCUMENTS

| | | |
|---|---|---|
| EP | 1991019 A1 | 11/2008 |
| EP | 2099242 A2 | 9/2009 |
| WO | 2006002048 A2 | 1/2006 |
| WO | 2007121331 A2 | 10/2007 |

OTHER PUBLICATIONS

"Prepay Geographic Local UK VoIP Numbers", https://www.opentelecom.co.uk/cms/products-services/prepay-geographic-local-uk-voip-numbers/, Retrieved on: May 18, 2017, 2 pages.

"Cisco Unified Communications Manager Express System Administrator Guide", Retrieved at: http://www.cisco.com/c/en/us/td/docs/voice_ip_comm/cucme/admin/configuration/manual/cmeadm/cmelpcor.html—on Jun. 28, 2017, 58 pages.

Upadhyay,"A Comprehensive study on tracking VoIP Caller", In IOSR Journal of Computer Engineering, vol. 9, Issue 1, Jan. 2013, pp. 61-65.

"Non-Final Office Action", U.S. Appl. No. 15/631,941, dated Sep. 8, 2017, 17 pages.

"Restriction Requirement", U.S. Appl. No. 15/630,247, dated Sep. 28, 2017, 8 pages.

"6 Best & Free Call Forwarding Android Apps", Available at: http://allusefulinfo.com/best-free-call-forwarding-android-apps/, Mar. 17, 2015, 10 pages.

"Non-Final Office Action", U.S. Appl. No. 15/630,247, dated Jan. 24, 2018, 14 pages.

"Non-Final Office Action", U.S. Appl. No. 15/337,381, dated Oct. 18, 2017, 31 pages.

"Non Final Office Action Issued in U.S. Appl. No. 15/669,553", dated May 9, 2018, 19 Pages.

"Final Office Action Issued in U.S. Appl. No. 15/669,553", dated Jun. 14, 2018, 43 Pages.

"Final Office Action Issued in U.S. Appl. No. 15/337,381", dated Jun. 14, 2018, 43 Pages.

"Non Final Office Action Issued in U.S. Appl. No. 15/631,941", dated Aug. 28, 2018, 23 Pages.

"International Search Report and Written Opinion Issued in PCT Application No. PCT/US2018/034510", dated Aug. 16, 2018, 10 Pages.

"International Search Report and Written Opinion Issued in PCT Application No. PCT/US2018/035518", dated Sep. 12, 2018, 14 Pages.

"International Search Report and Written Opinion Issued in PCT Application No. PCT/US2018/034003", dated Feb. 4, 2019, 17 Pages.

"Non-Final Office Action Issued in U.S. Appl. No. 16/181,243", dated Feb. 21, 2019, 11 Pages.

* cited by examiner

LOCATION DETERMINATION FOR A SERVICE REQUEST

BACKGROUND

Conventional communication clients configured to communicate over a network are associated with a static registered location. For example, a business communication client may be associated with a registered location that is mapped to an address of the business. In this case, if an emergency call is initiated using the communication client, the emergency call will be routed to an emergency dispatcher or service, such as a public-safety answering point, along with location information corresponding to the registered location of the communication client. This causes emergency services to be dispatched to the registered location of the communication client.

However, in the event that the communication client is installed on a mobile client device, then the user may utilize the communication client at various locations other than the registered location of the communication client. For example, the user may utilize the communication client while working at home, at a coffee shop, and so forth. In this scenario, if an emergency call is initiated using the communication client from a location outside of the registered location of the communication client, the emergency services will be dispatched to the registered location even though the user is not currently at the registered location. The incorrect routing of emergency services increases the likelihood that the user will be unable to obtain the needed emergency services, while also wasting the time and resources of the emergency services which are dispatched to the wrong location.

SUMMARY

Techniques for location determination for a service request (e.g., for emergency calling) are described. A service request, for instance, represents a request for emergency services. In one or more implementations, user input to initiate an emergency call over a network is received at a communication client implemented at a client device. The emergency call is established by communicating, to a communication service over the network, data of the emergency call along with an updated location of the client device. Doing so causes the communication service to communicate the data of the emergency call along with the updated location to a public-safety answering point if the updated location is different than a registered location of the communication client.

In one or more implementations, a registered location of a communication client configured for execution on a client device is maintained. Position information for the client device is obtained from a position information system, and an updated location of the client device is generated based at least in part on the position information. A request for an updated location of the client device is received from a communication service. The request is received in response to an emergency call initiated at the client device. In response to the request, the registered location of the communication client and the updated location of the client device are communicated to the communication service. Doing so causes the communication service to communicate data of the emergency call along with the updated location to a public-safety answering point if the updated location is different than the registered location of the communication client.

In one or more implementations, data corresponding to an emergency call is received over a network from a communication client implemented at a client device. A registered location of the communication client and an updated location of the client device is obtained, and the updated location of the client device is compared to the registered location of the communication client. If the updated location is different than the registered location, the data of the emergency call is routed along with the updated location to a public-safety answering point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
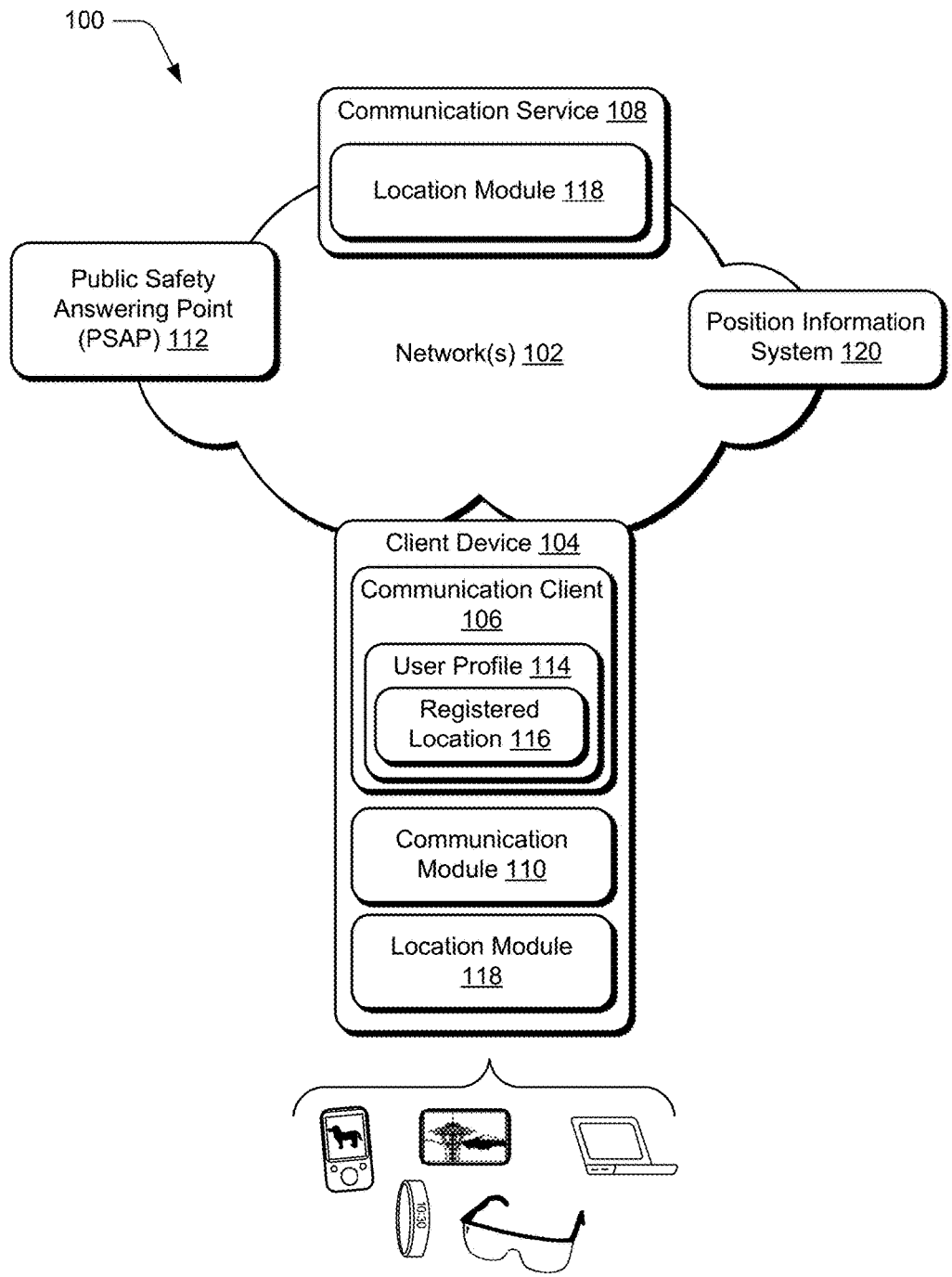
FIG. 1 is an illustration of an environment in an example implementation that is operable to employ techniques for emergency calling described herein.

Techniques for emergency calling are described. Unlike conventional solutions in which emergency calls initiated by a communication client outside of a registered location are incorrectly routed to the wrong location or blocked, the described techniques monitor location information pertaining to a current location of the client device to generate and maintain an updated location of the client device. When an emergency call is placed by the communication client from a location outside of the registered location, the described techniques route the emergency call to an emergency dispatch network or public-safety answering point along with the updated location of the client device. This enables emergency services to be routed to the user's current location. By causing emergency services to be routed to an accurate and updated location of the user, the described techniques both increase the likelihood of the user receiving the appropriate emergency services in a timely fashion, while at the same time reducing instances in which the time and resources of emergency services are wasted by responding to the wrong the location.

In one or more implementations, user input to initiate an emergency call over a network is received at a communication client implemented at a client device. The emergency call is established by communicating, to a communication service over the network, data of the emergency call along with an updated location of the client device. Doing so causes the communication service to communicate the data of the emergency call along with the updated location to a public-safety answering point if the updated location is different than a registered location of the communication client.

In one or more implementations, a registered location of a communication client configured for execution on a client device is maintained. Position information for the client device is obtained from a position information system, and an updated location of the client device is generated based at least in part on the position information. A request for an updated location of the client device is received from a communication service. The request is received in response to an emergency call initiated at the client device. In response to the request, the registered location of the communication client and the updated location of the client device is communicated to the communication service. Doing so causes the communication service to communicate data of the emergency call along with the updated location to a public-safety answering point if the updated location is different than the registered location of the communication client.

In one or more implementations, data corresponding to an emergency call is received over a network from a communication client implemented at a client device. A registered location of the communication client and an updated location of the client device is obtained, and the updated location of the client device is compared to the registered location of the communication client. If the updated location is different than the registered location, the data of the emergency call is routed along with the updated location to a public-safety answering point.

FIG. 1 is an illustration of an environment 100 in an example implementation that is operable to employ techniques for emergency calling described herein.

The environment 100 includes a communication network 102 ("network 102"), which is representative of different connected components that exchange, process, and/or route data to enable different forms of communication. Examples of the network 102 include a local access network (LAN), wide area network (WAN), the Internet, a wireless cellular communication network, a Public Switched Telephone Network (PSTN), an Internet of Things (IoT) network, and combinations thereof. The network 102, for instance, represents a combination of interconnected wireless and wired networks that enable communication at various geographic locations and via a variety of different communication modalities.

Connected to the network 102 is a client device 104, which is representative of an end-user device configured to communicate via the network 102. The client device 104 may be configured in a variety of ways, such as a wireless cellular phone (e.g., a smartphone), a tablet, a laptop, and so forth. One example implementation of the client device 104 is presented below as the computing device 802 of FIG. 8.

The client device 104 includes a communication client 106, which is representative of functionality to enable different forms of communication via the client device 104. Examples of the communication client 106 include a voice communication application (e.g., a Voice over Internet Protocol (VoIP) client), a video communication application, a messaging application, a content sharing application, and combinations thereof. The communication client 106, for instance, enables different communication modalities to be combined to provide diverse communication scenarios. In at least some implementations, the communication client 106 represents an application that is installed on the client device 104. Additionally or alternatively, the communication client 106 can be implemented all or in part as a remote application, such as accessed via a web browser, a web application, and so forth.

According to various implementations, the communication client 106 is configured to enable various types of communication via interaction with a communication service 108. For example, the communication client 106 and the communication service 108 may enable communication of "over-the-top" content (OTT). The communication service 108 is representative of a service to perform various tasks for management of communication between the client device 104 and other entities, e.g., other client devices. The communication service 108, for instance, can manage initiation, moderation, and termination of communication sessions for the client device 104. Examples of the communication service 108 include a VoIP service, an online conferencing service, a unified communications and collaboration (UC&C) service, and so forth. In at least some implementations, the communication service 108 may be implemented as and/or be connected to a private branch exchange (PBX) in communication with a Public Switched Telephone Network ("PSTN") to enable voice communication between the client device 104 and other devices and/or services. The client device 104 further includes a communication module 110 which is representative of functionality for enabling the client device 104 to communicate data via wired and/or wireless connectivity to the network 102.

In various implementations, the communication client 106 is configured to enable communication of an emergency call to an emergency dispatcher or emergency service, such as a public-safety answering point 112 via interaction with the communication service 108. Public-safety answering point 112 (sometimes called a "public-safety access point"), is a call center responsible for answering calls to an emergency telephone number for police, firefighting, and ambulance services, such as when the user dials "911". Trained telephone operators are also usually responsible for dispatching these emergency services by routing the call to the appropriate emergency service such that the emergency services are dispatched.

In one or more implementations, the communication client 106 is associated with a user profile 114, which represents a way of authenticating a particular user with the communication client 106 and the communication service 108, and for tracking user-specific authentication information (e.g., username, password, and so forth), user settings, contacts, and other data for the user. In at least some implementations, the user profile 114 is portable such that the user can authenticate with a different instance of the communication client 106, and make calls via the different instance of the communication client 106 that are identified as being connected with the user profile 114.

The user profile 114 may include a registered location 116 of the communication client 106, such as a registered address of the communication client 106. For example, the user may provide a registered address to the communication client 106 in during a registration process to activate the communication client 106. In one or more implementations, the communication client 106 corresponds to a business communication client, in which case the registered location 116 may correspond to a business address. In other instances, however, the registered location 116 may correspond to an address other than a business address, such as an address of the user's home.

Environment 100 further includes a location module 118 which is representative of functionality for receiving, transmitting, and/or processing location information. The location module 118, for instance, supports transmission, reception, and processing of position information according to a variety of different technologies, such as Global Positioning System (GPS), cellular communication, WiFi™, satellite communication, radio frequency (RF) communication, subnet information, Ethernet switch and/or port data, Internet Protocol (IP) address information, and so forth.

According to various implementations, the location module 118 can communicate with a position information system 120 to obtain position information for the client device 104. The position information system 120 is representative of various types of position information systems that can transmit and/or receive position information. Examples of the position information system 120 include GPS satellites, cellular telephone networks, wireless data (e.g., WiFi™) networks, location information services (LIS), radio frequency identifier (RFID) functionality, subnets of wired networks, Ethernet switches and/or ports, and so forth. In this example, the location module 118 can be implemented at the communication service 108 and/or at the client device 104, or as a remote third party service.

Generally, the location module 118 generates and maintains an updated location of the client device 104, which may be more accurate than the registered location 116 of the communication client 106. The location module 118 can then provide the updated location to the communication client 106 and/or the communication service 108. In this way, unlike conventional solutions in which emergency calls initiated outside of a registered location are incorrectly routed to the wrong location or blocked, the described techniques communicate the updated location of the client device along with the emergency call to the emergency services, or a proxy thereof such as public-safety answering point 112. In this way, emergency services are dispatched to the updated location of the client device 104 even in cases where the client device is outside of the registered location 116.

While described techniques will be discussed with regards to communicating an updated location of a client device for an emergency call, the techniques may also be applied to other "high priority" communication sessions which are communicated to endpoints other than the public-safety answering point 112.

Having described an example environment in which the techniques described herein may operate, consider now a discussion of some example implementation scenarios for emergency calling in accordance with one or more implementations.

The following section describes example implementation scenarios for emergency calling. The implementation scenarios may be implemented in the environment 100 discussed above, the system 800 described below, and/or any other suitable environment.

Figure 2:
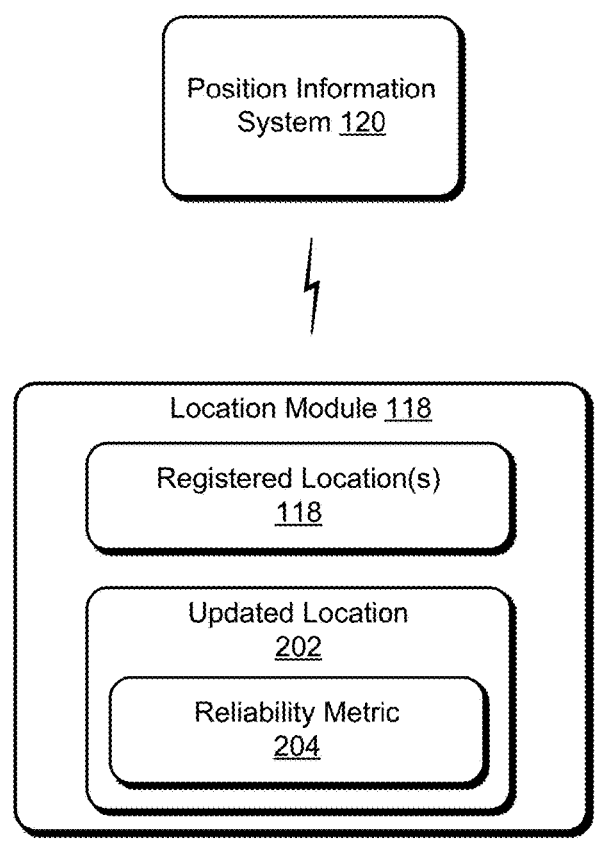
FIG. 2 depicts an example implementation scenario for techniques for emergency calling in accordance with one or more implementations.

FIG. 2 depicts an example implementation scenario 200 for techniques for emergency calling in accordance with one or more implementations. While the scenario 200 is illustrated as being implemented in the environment 100 introduced above, it is to be appreciated that various aspects of the scenario 200 may be in any other suitable environment.

In scenario 200, location module 118 maintains registered locations 116 for communication clients 106. As discussed above, the registered location 116 of the communication client 106 generally represents a registered address of the communication client 106. For example, the user may provide a registered address to the communication client 106 in order to activate the communication client. In one or more implementations, the communication client 106 corresponds to a business communication client, in which case the registered location 116 may correspond to a business address. In other instances, however, the registered location 116 may correspond to an address other than a business address, such as an address of the user's home.

The location module 118 is further configured to communicate with position information system 120 to obtain position information for the client device 104. The position information system 120 is representative of various types of position information systems that can transmit and/or receive position information. Examples of the position information system 120 include GPS satellites, cellular telephone networks, wireless data (e.g., WiFi™) networks, location information services (LIS), radio frequency identifier (RFID) functionality, subnets of wired networks, Ethernet switches and/or ports, and so forth. As discussed throughout, the location module 118 can be implemented at the communication service 108 and/or at the client device 104, or as a remote third party service.

The location module 118 generates and maintains an updated location 202 of the client device 104 based on the position information received from the position information system 120. Generally, the updated location 202 of client device 104 is more accurate than the registered location 116 of the communication client 106. The updated location 202 may be generated by the location module 118 based on a variety of different types of position information received from position information system 120. The location module 118, for instance, supports transmission, reception, and processing of position information according to a variety of different technologies, such as Global Positioning System (GPS), cellular communication, WiFi™, satellite communication, radio frequency (RF) communication, subnet information, Ethernet switch and/or port data, Internet Protocol (IP) address information, and so forth.

In one or more implementations, the location module 118 may be further configured to generate a reliability metric 204 indicating a reliability or accuracy of the updated location 202. For example, based on the position information received from the position information system 120, the location module 118 can determine a reliability of the updated location 202. For example, in cases where the updated location is based on GPS data, the reliability metric 204 will indicate a high reliability or accuracy of the updated location 202. In other cases, the location module 118 may be able to determine that the client device 104 is not currently at the registered location 116, but may be unable to determine an accurate updated location 202. In this case, the reliability metric 204 may indicate a low reliability or accuracy of the updated location 202.

Figure 3:
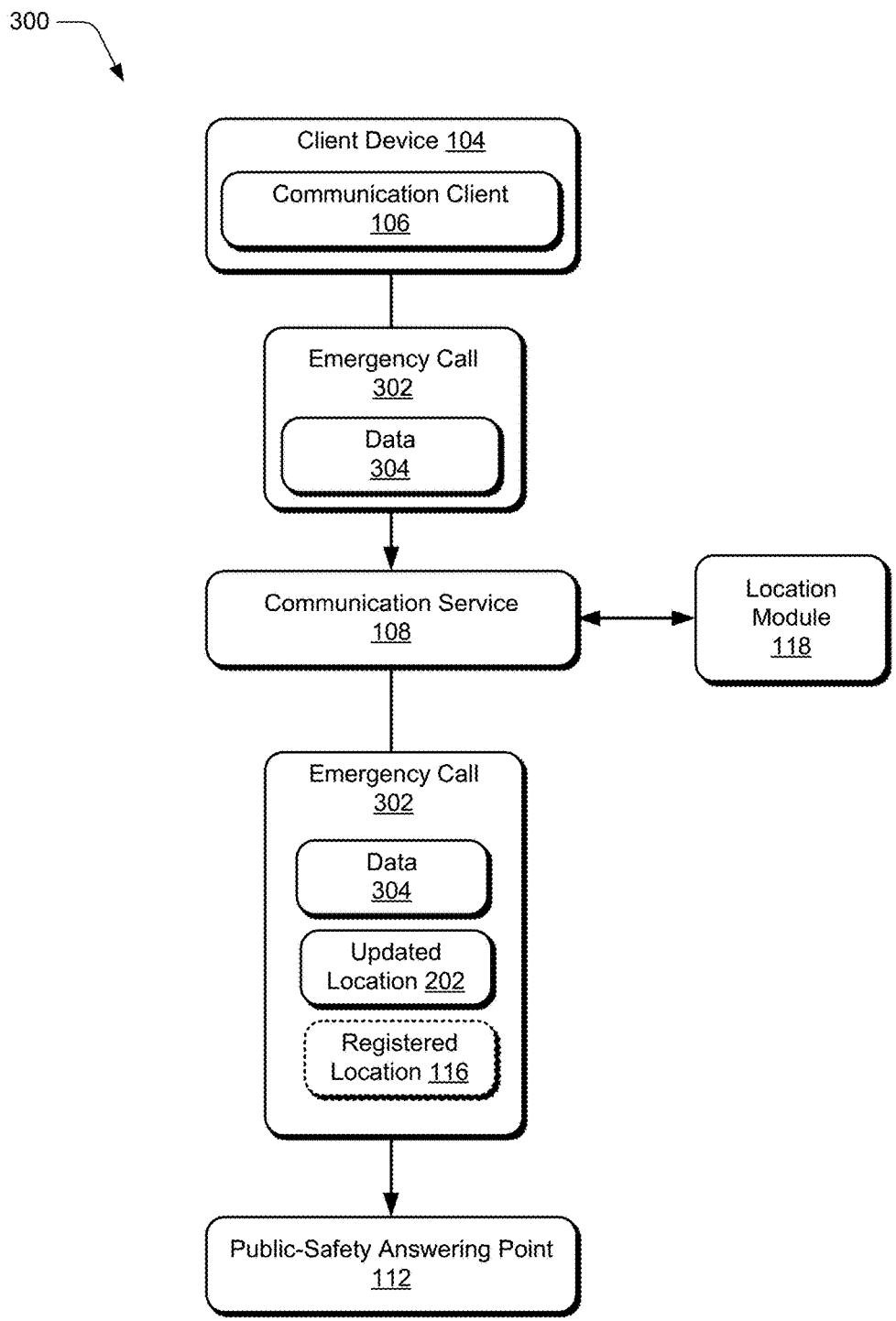
FIG. 3 depicts an additional example implementation scenario for techniques for emergency calling in accordance with one or more implementations.

FIG. 3 depicts an additional example implementation scenario 300 for emergency calling in accordance with one or more implementations. While the scenario 300 is illustrated as being implemented in the environment 100 introduced above, it is to be appreciated that various aspects of the scenario 300 may be in any other suitable environment.

In scenario 300, a communication client 106 implemented at a client device 104 initiates an emergency call 302. For example, an emergency call 302 can be initiated when user input to initiate an emergency call 302 is received by communication client 106 implemented at client device 104, such as when the user dials an emergency phone number (e.g., "911") into a user interface of the communication client 106 or selects an emergency call control.

Client device 104 establishes the emergency call 302 by communicating data 304 of the emergency call 302 to the communication service 108 via network 102. The communication service 108 receives the data 304 of the emergency call 302 from client device 104 via network 102, and identifies the call as corresponding to an emergency call.

The communication service 108 then determines whether the client device 104 is currently located at the registered location 116 of the communication client 106. To do so, the communication service 124 obtains the registered location 116 of the communication client 106 and the updated location 202 of the client device 104. In one or more implementations, the communication service 108 obtains the registered location 116 and updated location 202 by communicating a request to the location module 118. The location module 118, as discussed throughout, may be implemented at the communication service 108, or remote from the communication service 108, such as at the client device 104 or at a remote third party service. In cases in which the location module 118 is implemented at the client device 104, the communication client 106 may include the updated location 202 along with the data 304 of the emergency call 302 communicated to the communication service 108.

Next, the communication service 108 compares the updated location 202 to the registered location 116. If the updated location 202 is different than the registered location 116, then the communication service determines that the client device 104 is currently located outside of the registered location 116. The communication service 108 then routes the data 304 of the emergency call 302 along with the updated location 202 of the client device 104 to the emergency dispatcher or service, or proxy thereof, such as public-safety answering point 112.

The public-safety answering point 112 receives the data 304 of emergency call 302 and the updated location 202, and determines the current location of the user based on the updated location 202. The public-safety answering point 112 can then dispatch emergency services (e.g., police services, fire-fighting services, or ambulance services) to the updated location 202 of client device 104. Doing so prevents the emergency call from being blocked or routed to the wrong location.

In one or more implementations, the communication service 108 is configured to communicate both the updated location 202 along with the registered location 116 with data 304 of the emergency call 302 to the public-safety answering point 112. The registered location 116 can be communicated to the public-safety answering point for regulatory compliance and/or verification purposes. In this case, the updated location 202 and the registered location 116 can be identified as such, so that the public-safety answering point 112 utilizes the updated location 202 for dispatching the emergency services and utilizes the registered location 116 for regulatory compliance and/or verification purposes.

In some cases, the communication service 108 may determine that that the updated location 202 matches the registered location 116. In this case, the communication service 108 may route the data 304 of the emergency call 302 to the public-safety answering point 112 along with the registered location 116.

In one or more implementations, the communication service 108 determines whether or not to include the updated location 202 with the data 304 of the emergency call 302 based at least in part on the reliability metric 204 associated with the updated location 202.

Figure 4:
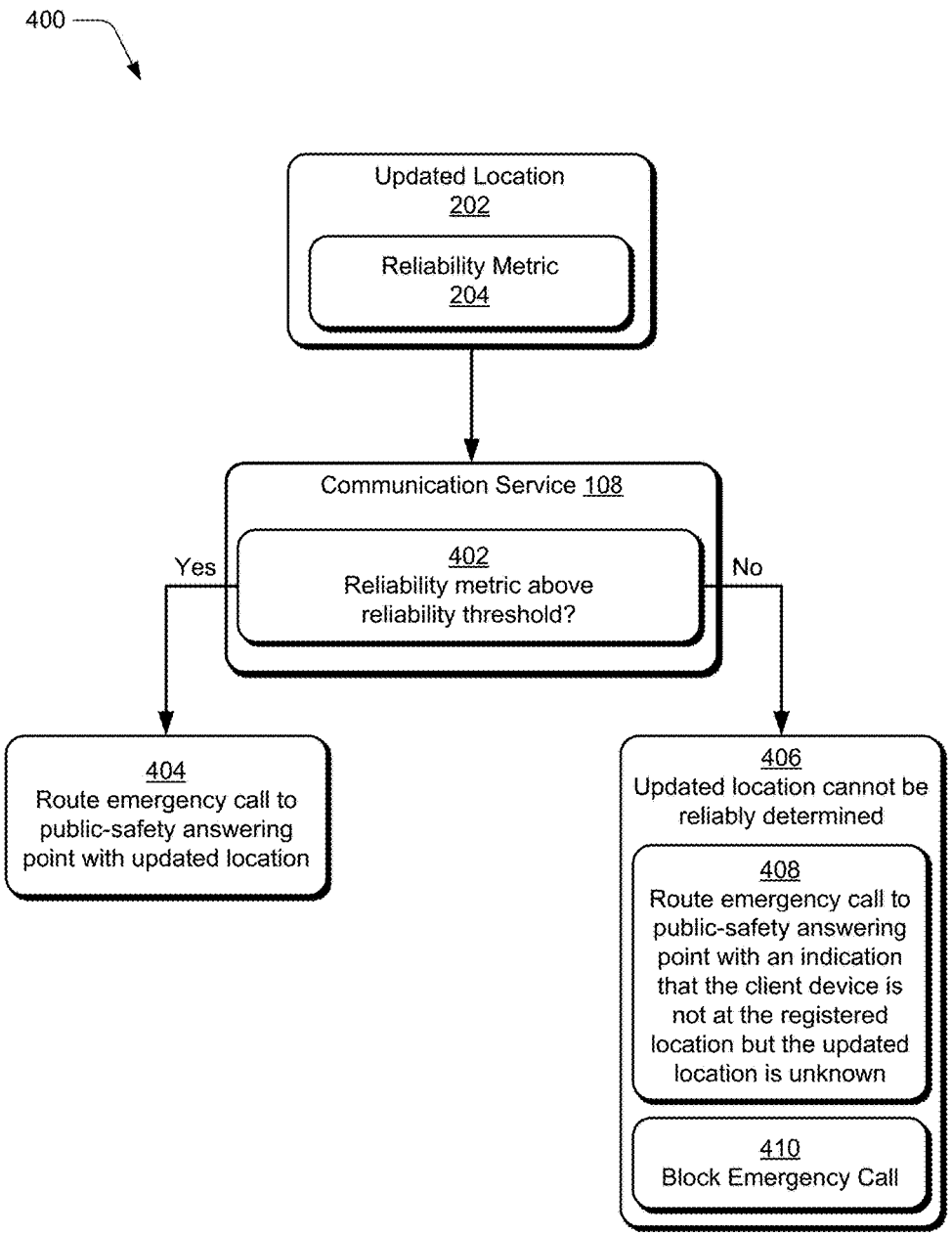
FIG. 4 depicts an additional example implementation scenario for techniques for emergency calling in accordance with one or more implementations.

As an example, consider FIG. 4 which depicts an additional example implementation scenario 400 for emergency calling in accordance with one or more implementations. While the scenario 400 is illustrated as being implemented in the environment 100 introduced above, it is to be appreciated that various aspects of the scenario 400 may be in any other suitable environment.

In scenario 400, the communication client 106 obtains the updated location 202 and the corresponding reliability metric 204 from the location module 118. At 402, the communication client 106 determines whether the reliability metric is above a reliability threshold. For example, the reliability metric 204 may be above the reliability threshold if the reliability metric 204 corresponds to a high reliability, whereas the reliability metric may be below the reliability threshold if the reliability metric 204 corresponds to a low reliability. Notably, if the reliability metric 204 is above the reliability threshold, then this indicates that the client device 104 is likely at the updated location 202, whereas if the reliability metric 204 is below the reliability threshold, then this may indicate that the location module 118 is unable to accurately determine the current location of the client device 104.

As discussed above, in cases where the updated location 202 is based on GPS data, the reliability metric 204 will indicate a high reliability or accuracy of the updated location 202. In other cases, the location module 118 may be able to determine that the client device 104 is not currently at the registered location 116, but may be unable to determine an accurate updated location 202. In this case, the reliability metric 204 may indicate a low reliability or accuracy of the updated location 202.

At 404, if the reliability metric 204 is above the reliability threshold, then communication client 106 routes the data 304 of the emergency call 302 to the public-safety answering point 112 along with the updated location 202. As discussed above, in some cases the registered location 116 may also be included for regulatory compliance.

Alternately, at 406, if the reliability metric 204 is below the reliability threshold, then the communication client 106 determines that the updated location 202 cannot be reliably determined. In this event, the communication service 108 may be configured to take a variety of different actions.

In one or more implementations, at 408, the communication service 108 routes the emergency call 302 to the public-safety answering point 112 with an indication or schema that the user is not at the registered location but the updated location is unknown. For example, the location module 118 may be able to reliably determine that the client device is not at the registered location, but be unable to determine an accurate updated location 202. For example, based on base station information indicating that the user is in San Francisco, the location module 118 can reliably determine that the user is not at the registered location 116 in Seattle. However, there may be no GPS data available to the location module 118 and/or the location module 118 may be unable to triangulate the current location of the client device 104. Thus, in this scenario, the location module 118 can reliably determine that the user is not at the registered location, but is unable to determine a reliable updated location 202.

This indication or schema may cause the public-safety answering point 112 to query the communication client 106 in order to determine the updated address, or indicate such a query should be performed once connecting the call to the appropriate responders. For example, the indication provided by the communication service 108 notifies the public-safety answering point that the user is not at the registered location 116, but that the current location of the user is unknown. As such, once the public-safety answering point or the appropriate responders answer the emergency call 302, the first thing they will do is ask the user for their current location. If the user answers the emergency call and provides their current location, then the emergency services may be dispatched to the user provided location.

Alternately, in one or more implementations, at 410 the communication service 108 may block the emergency call 302 if the reliability metric is below the reliability threshold in order to prevent the emergency services from being dispatched to the wrong location.

Having discussed various example implementation scenarios, consider now some example procedures in accordance with one or more implementations.

The following discussion describes some example procedures for emergency calling in accordance with one or more implementations. The example procedures may be employed in the environment 100 of FIG. 1, the system 800 of FIG. 8, and/or any other suitable environment. The procedures, for instance, represent example procedures for implementation of the scenarios described above. In at least some implementations, the steps described for the various procedures can be implemented automatically and independent of user interaction.

Figure 5:
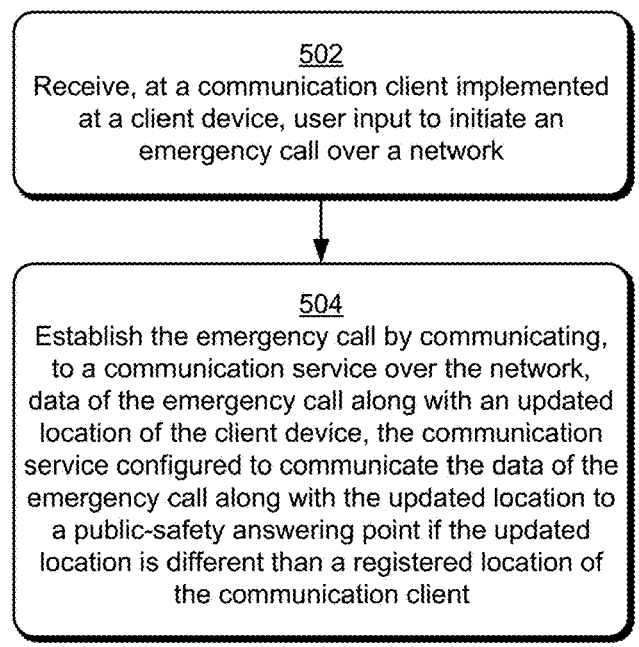
FIG. 5 is a flow diagram that describes steps in a method for emergency calling in accordance with one or more implementations.

FIG. 5 is a flow diagram that describes steps in a method 500 for emergency calling in accordance with one or more implementations. In one or more implementations the method 500 describes steps implemented by a communication client, such as communication client 106 at a client device 104.

At 502, user input to initiate an emergency call over a network is received at a communication client implemented at a client device. For example, communication client 106, implemented at client device 104, receives user input to initiate an emergency call 302 over a network 102, such as when the user dials "911".

At 504, the emergency call is established by communicating, to a communication service over the network, data of the emergency call along with an updated location of the client device. The communicating causes the communication service to communicate the data of the emergency call along with the updated location to a public-safety answering point if the updated location is different than a registered location of the communication client. For example, communication client 106 establishes the emergency call 302 by causing client device 104 to communicate, to communication service 108 over network 102, data 304 of the emergency call 302 along with an updated location 202 of the client device 104. The communicating causes the communication service 108 to communicate the data 304 of the emergency call 302 along with the updated location 202 to a public-safety answering point 112 if the updated location 202 is different than a registered location 116 of the communication client 106. Doing so causes the public-safety answering point to dispatch emergency services (e.g., police or an ambulance) to the updated location 202 of client device 104.

Figure 6:
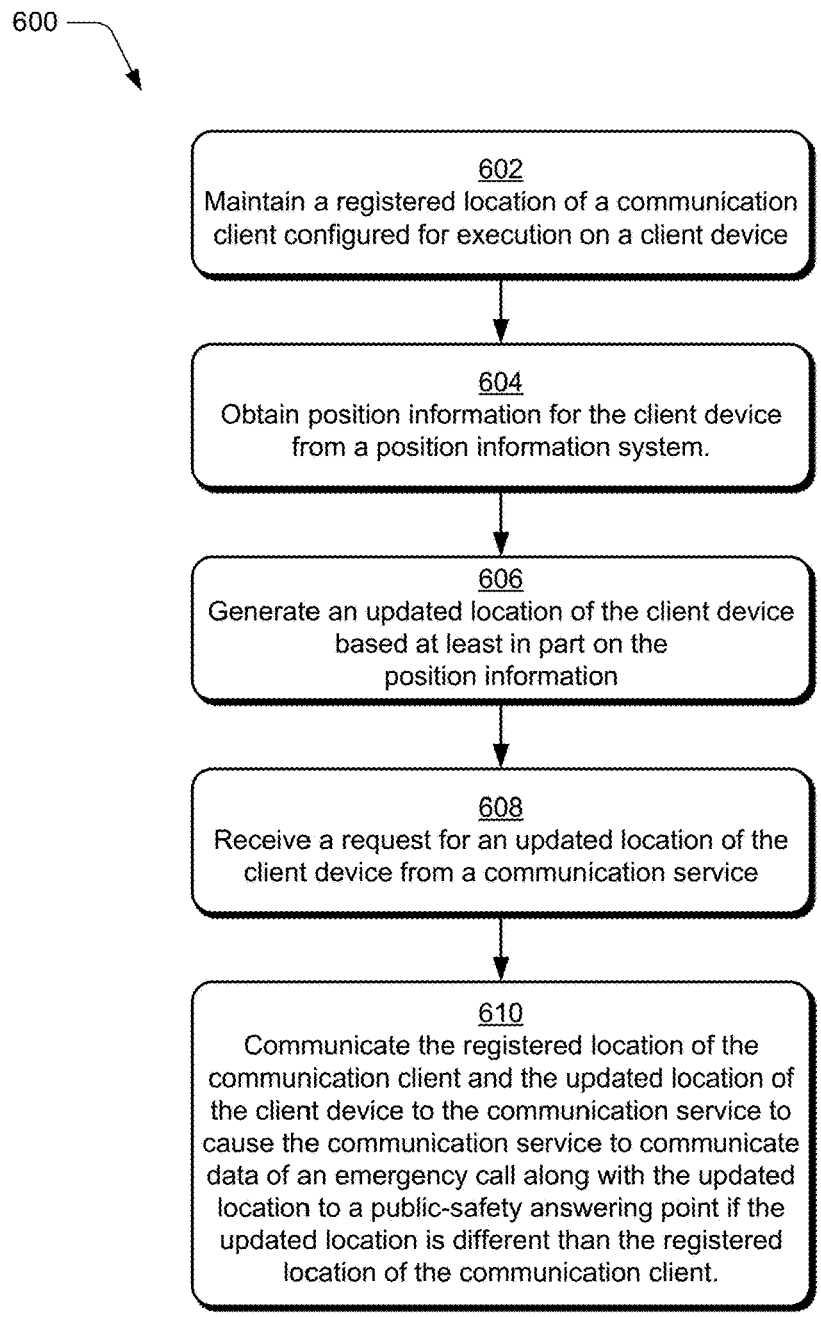
FIG. 6 is a flow diagram that describes steps in an additional method for emergency calling in accordance with one or more implementations.

FIG. 6 is a flow diagram that describes steps in an additional method 600 for emergency calling in accordance with one or more implementations. In one or more implementations the method 600 describes steps implemented by a location module, such as location module 118 implemented at communication service 108 and/or client device 104.

At 602, a registered location of a communication client configured for execution on a client device is maintained. For example, location module 118 maintains a registered location 116 of a communication client 106 configured for execution on a client device 104. In one or more implementations, the registered location 116 corresponds to a business address or home address associated with the communication client 106.

At 604, position information for the client device is obtained from a position information system. For example, location module 118 obtains position information for the client device 104 from a position information system 120. The position information may include a variety of different types of information usable to identify a location of the client device 104, such as GPS data.

At 606, an updated location of the client device is generated based at least in part on the position information. For example, location module 118 generates an updated location 202 of the client device based at least in part on the position information obtained from position information system 120. In one or more implementations, the location module 118 may also generate a reliability metric 204 indicating a reliability of the updated location 202.

At 608, a request for an updated location of the client device is received from a communication service. The request from the communication service is initiated in response to an emergency call being initiated at the client device. For example, location module 118 receives a request for the updated location 202 of the client device 104 from communication service 108 in response to an emergency call 302 being initiated at the client device 104.

At 610, in response to the request, the registered location of the communication client and the updated location of the client device is communicated to the communication service, which causes the communication service to communicate data of the emergency call along with the updated location to a public-safety answering point if the updated location is different than the registered location of the communication client. For example, location module 118 communicates the registered location 116 of the communication client 106 and the updated location 202 of the client device 104 to the communication service 108. Doing so causes the communication service 108 to communicate data 304 of the emergency call 302 along with the updated location 202 to a public-safety answering 112 point if the updated location 202 is different than the registered location 116 of the communication client 106. Doing so causes the public-safety answering point 112 to dispatch emergency services (e.g., police or an ambulance) to the updated location 202 of client device 104.

Figure 7:
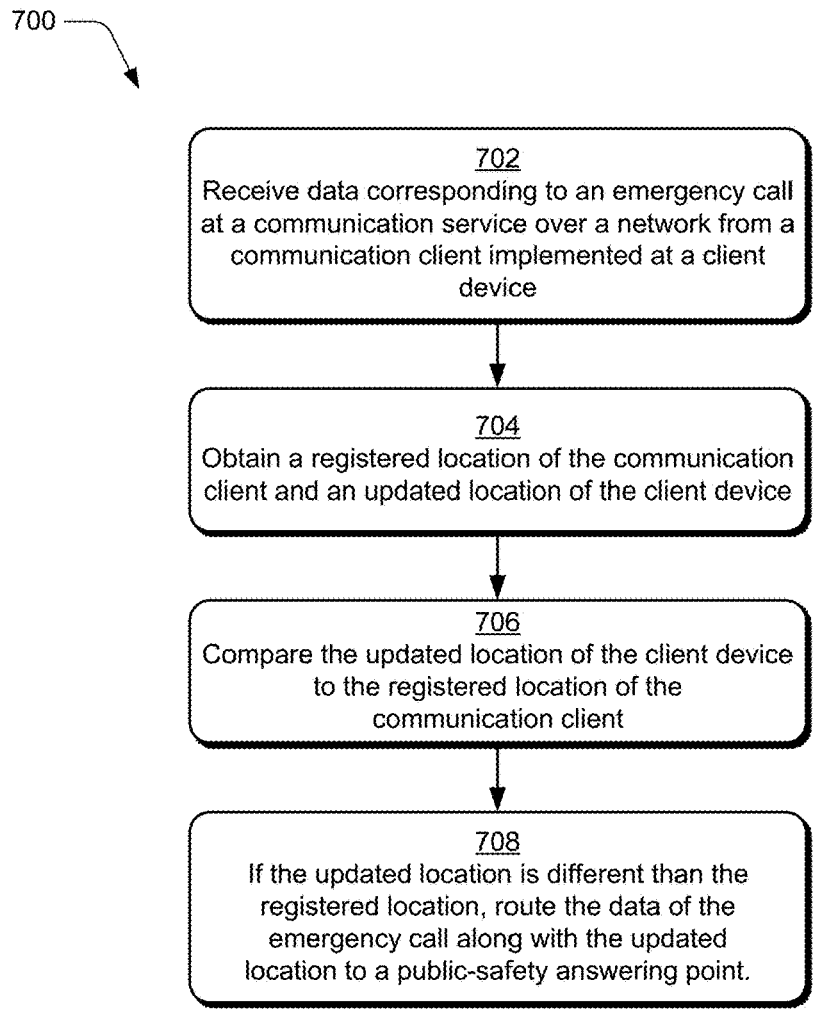
FIG. 7 is a flow diagram that describes steps in an additional method for emergency calling in accordance with one or more implementations.

FIG. 7 is a flow diagram that describes steps in an additional method 700 for emergency calling in accordance with one or more implementations. In one or more implementations the method 700 describes steps implemented by a communication service, such as communication service 108.

At 702, data corresponding to an emergency call is received at a communication service over a network from a communication client implemented at a client device. For example, communication service 108 receives data 304 corresponding to an emergency call 302 over network 102 from a communication client 106 implemented at a client device 104.

At 704, a registered location of the communication client and an updated location of the client device is obtained. For example, communication service 108 obtains registered location 116 of the communication client 106 and updated location 202 of the client device 104.

At 706, the updated location of the client device is compared to the registered location of the communication client, and at 708, if the updated location is different than the registered location, the data of the emergency call is routed along with the updated location to a public-safety answering point. For example, communication service 108 compares the updated location 202 of the client device 104 to the registered location 116 of the communication client 106. If the updated location 202 is different than the registered location 116, the communication service 108 routes the data 304 of the emergency call and the updated location 202 to public-safety answering point 112. Doing so causes the public-safety answering point 112 to dispatch emergency services (e.g., police or an ambulance) to the updated location 202 of client device 104.

Figure 8:
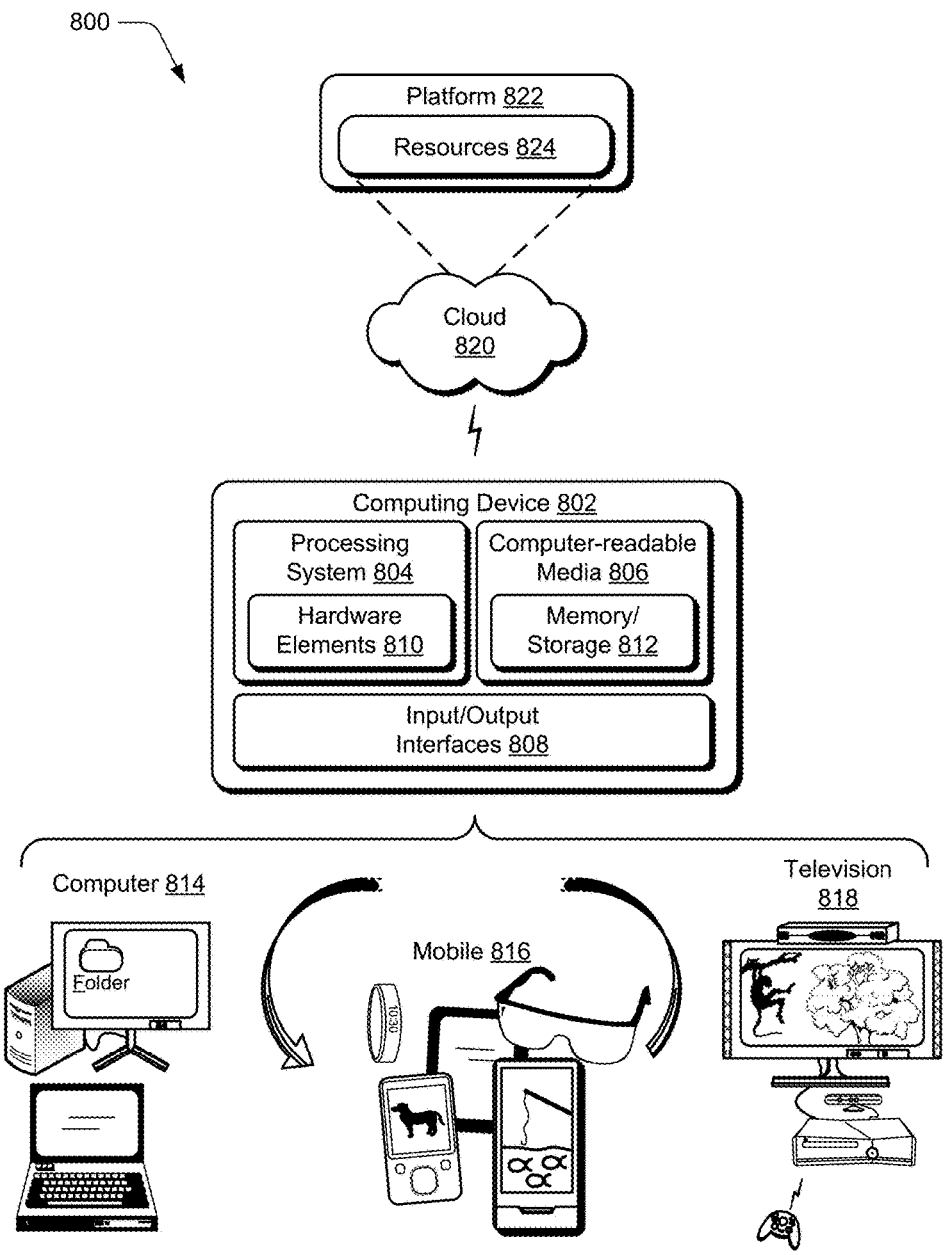
FIG. 8 illustrates an example system and computing device as described with reference to FIG. 1, which are configured to implement various aspects of the techniques described herein.

FIG. 8 illustrates an example system generally at 800 that includes an example computing device 802 that is representative of one or more computing systems and/or devices that may implement various techniques described herein. For example, the client device 104 discussed above with reference to FIG. 1 can be embodied as the computing device 802. The computing device 802 may be, for example, a server of a service provider, a device associated with the client (e.g., a client device), an on-chip system, and/or any other suitable computing device, apparatus, and/or computing system.

The example computing device 802 as illustrated includes a processing system 804, one or more computer-readable media 806, and one or more I/O Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as an module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, wearable device, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the client device 104, the communication service 124, and/or the quality service 126 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi™ network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Example implementations described herein include, but are not limited to, one or any combinations of one or more of the following examples.

In one or more examples, a method implemented by a communication service implemented at one or more computing devices comprises: receiving, over a network from a communication client implemented at a client device, data corresponding to an emergency call; obtaining a registered location of the communication client and an updated location of the client device; comparing the updated location of the client device to the registered location of the communication client; and if the updated location is different than the registered location, routing the data of the emergency call along with the updated location to a public-safety answering point.

An example as described alone or in combination with any of the other examples described above or below, further comprising routing the data of the emergency call along with both the updated location and the registered location to the public-safety answering point.

An example as described alone or in combination with any of the other examples described above or below, wherein the registered location is routed to the public-safety answering point for regulatory compliance.

An example as described alone or in combination with any of the other examples described above or below, further comprising, if the updated location is the same as the registered location, routing the data of the emergency call with the registered location of the communication client.

An example as described alone or in combination with any of the other examples described above or below, wherein the updated location of the communication client is received from the client device along with the data of the emergency call.

An example as described alone or in combination with any of the other examples described above or below, wherein the updated location of the client device is received from a location module implemented remote from the client device.

An example as described alone or in combination with any of the other examples described above or below, wherein the registered location comprises a business address associated with the communication client.

An example as described alone or in combination with any of the other examples described above or below, wherein the updated location is generated based on location information received from a position information system.

An example as described alone or in combination with any of the other examples described above or below, further comprising obtaining a reliability metric indicating a reliability of the updated location, the reliability metric based at least in part on the location information received from the position information system.

An example as described alone or in combination with any of the other examples described above or below, further comprising: comparing the reliability metric to a reliability threshold; and routing the data of the emergency call along with the updated location to the public-safety answering point if the reliability metric is above the reliability threshold.

An example as described alone or in combination with any of the other examples described above or below, further comprising, if the reliability metric is below the reliability threshold, routing the data of the emergency call to the public-safety answering point with an indication that the client device is not at the registered location but the updated location is unknown.

An example as described alone or in combination with any of the other examples described above or below, wherein the indication causes the public-safety answering point to query the communication client for the updated location.

An example as described alone or in combination with any of the other examples described above or below, further comprising, if the reliability metric is below the reliability threshold, blocking the emergency call.

In one or more examples, one or more computer-readable storage devices have instructions stored thereon that, responsive to execution by one or more processors, implement a location module that is configured to perform operations comprising: maintaining a registered location of a communication client configured for execution on a client device; obtaining position information for the client device from a position information system; generating an updated location of the client device based at least in part on the position information; receiving a request for the updated location of the client device from a communication service, the request from the communication client initiated in response to an emergency call initiated at the client device; in response to the request, communicating the registered location of the communication client and the updated location of the client device to the communication service, the communicating causing the communication service to communicate data of the emergency call along with the updated location to a public-safety answering point if the updated location is different than the registered location of the communication client.

An example as described alone or in combination with any of the other examples described above or below, wherein the location module is further configured to perform operations comprising generating a reliability metric of the updated location based at least in part on the position information received from the position information system, the reliability metric indicating a reliability of the updated location.

An example as described alone or in combination with any of the other examples described above or below, wherein the location module is implemented at the client device.

An example as described alone or in combination with any of the other examples described above or below, wherein the location module is implemented at the communication service.

An example as described alone or in combination with any of the other examples described above or below, wherein the location module is further configured to perform operations comprising providing the registered location of the communication client along with the updated location of the client device to the communication service in response to the request.

In one or more examples, a client device comprises: at least one processor; and one or more computer-readable storage media including instructions stored thereon that, responsive to execution by the at least one processor, implement a communication client, the communication client configured to perform operations comprising: receiving, at the communication client, user input to initiate an emergency call over a network; and establishing the emergency call by communicating, to a communication service over the network, data of the emergency call along with an updated location of the client device, the communicating causing the communication service to communicate the data of the emergency call along with the updated location to a public-safety answering point if the updated location is different than a registered location of the communication client.

An example as described alone or in combination with any of the other examples described above or below, wherein the updated location of the client device is generated based on position information received from a position information system, and wherein the registered location comprises a business address associated with the communication client.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
    receiving, over a network from a communication client implemented at a client device, data corresponding to a service request;
    obtaining a registered location of the communication client, an updated location of the client device, and a reliability metric indicating a reliability of the updated location of the client device;
    comparing the updated location of the client device to the registered location of the communication client to determine that the updated location is different than the registered location; and
    determining whether to route the data of the service request along with the updated location to an answering point based on whether the reliability metric for the updated location is above a reliability threshold, including:
        routing the data of the service request along with the updated location to the answering point based on determining that the reliability metric is above the reliability threshold; or
        determining that the updated location cannot reliably be determined based on determining that the reliability metric is below the reliability threshold.

2. The method of claim 1, further comprising routing the data of the service request along with both the updated location and the registered location to the answering point based on determining that the reliability metric is above the reliability threshold.

3. The method of claim 2, wherein the registered location is routed to the answering point for regulatory compliance.

4. The method of claim 1, further comprising, if the updated location is the same as the registered location, routing the data of the service request with the registered location of the communication client to the answering point.

5. The method of claim 1, wherein the updated location of the communication client is received from the client device along with the data of the service request.

6. The method of claim 1, wherein the updated location of the client device is received from a location module implemented remote from the client device.

7. The method of claim 1, wherein the registered location comprises a business address or a home address associated with the communication client.

8. The method of claim 1, wherein the updated location is generated based on location information received from a position information system.

9. The method of claim 8, wherein the reliability metric is determined based at least in part on the location information received from the position information system.

10. The method of claim 1, further comprising, if the reliability metric is below the reliability threshold, routing the data of the service request to the answering point with an indication that the client device is not at the registered location but the updated location is unknown.

11. The method of claim 10, wherein the indication causes the answering point to query the communication client for the updated location.

12. The method of claim 1, further comprising, if the reliability metric is below the reliability threshold, blocking the service request.

13. The method of claim 1, wherein the answering point comprises a public-safety answering point, and the service request comprises an emergency service call.

14. One or more computer-readable storage devices having instructions stored thereon that, responsive to execution by one or more processors, perform operations comprising:
    maintaining a registered location of a communication client configured for execution on a client device;
    obtaining position information for the client device from a position information system;
    generating an updated location of the client device based at least in part on the position information, and a reliability metric for the updated location;
    receiving a request for the updated location of the client device from a communication service, the request from the communication client initiated in response to a service request initiated at the client device;
    determining whether to provide the updated location to the communication service based on whether the reliability metric for the updated location is above a reliability threshold, including:
        sending the updated location to the communication service based on determining that the reliability metric is above the reliability threshold; or
        communicating an indication to the communication service that the updated location cannot reliably be determined based on determining that the reliability metric is below the reliability threshold.

15. The one or more computer-readable storage devices of claim 14, wherein said generating the reliability metric is based at least in part on the position information received from the position information system, the reliability metric indicating a reliability of the updated location.

16. The one or more computer-readable storage devices of claim 14, wherein the operations are performed at the client device.

17. The one or more computer-readable storage devices of claim 14, wherein the operations further comprise, based on determining that the reliability metric is above the reliability threshold, providing the registered location of the communication client along with the updated location of the client device to the communication service in response to the request.

18. The one or more computer-readable storage devices of claim 14, wherein the service request comprises an emergency service call from the client device, and wherein the operations further comprise, based on determining that the reliability metric is above the reliability threshold, causing the emergency call to be routed along with the updated location to a public-safety answering point.

19. A system comprising:
one or more processors; and
one or more computer-readable devices storing instruction that are executable by the one or more processors to perform operations including:
  receiving, over a network from a communication client implemented at a client device, data corresponding to a service request;
  obtaining a registered location of the communication client, an updated location of the client device, and a reliability metric indicating a reliability of the updated location of the client device;
  comparing the updated location of the client device to the registered location of the communication client to determine that the updated location is different than the registered location; and
  determining whether to route the data of the service request along with the updated location to an answering point based on whether the reliability metric for the updated location is above a reliability threshold, including:
    routing the data of the service request along with the updated location to the answering point based on determining that the reliability metric is above the reliability threshold; or
    determining that the updated location cannot reliably be determined based on determining that the reliability metric is below the reliability threshold.

20. The system of claim 19, wherein the answering point comprises a public-safety answering point, and the service request comprises an emergency service call.

* * * * *